(12) United States Patent
Zimmer et al.

(10) Patent No.: US 12,427,657 B2
(45) Date of Patent: Sep. 30, 2025

(54) METHOD FOR CREATING GRIPPING SEQUENCE PROGRAMS

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 157 days.

(21) Appl. No.: 18/289,448

(22) PCT Filed: May 5, 2022

(86) PCT No.: PCT/DE2022/000048
§ 371 (c)(1),
(2) Date: Feb. 5, 2024

(87) PCT Pub. No.: WO2022/233352
PCT Pub. Date: Nov. 10, 2022

(65) Prior Publication Data
US 2024/0375275 A1 Nov. 14, 2024

(30) Foreign Application Priority Data
May 7, 2021 (DE) .......................... 102021002418.4

(51) Int. Cl.
*B25J 9/00* (2006.01)
*B25J 9/16* (2006.01)

(52) U.S. Cl.
CPC ........... *B25J 9/1612* (2013.01); *B25J 9/1656* (2013.01); *B25J 9/1661* (2013.01)

(58) Field of Classification Search
CPC . B25J 9/1656; B25J 9/16; B25J 9/1612; B25J 9/1661; G05B 19/42
(Continued)

(56) References Cited

U.S. PATENT DOCUMENTS 5,297,238 A * 3/1994 Wang ..................... B25J 9/1697
700/254
9,272,423 B2 * 3/2016 Gordon ................ B25J 15/0491
(Continued)

FOREIGN PATENT DOCUMENTS

DE 102012111701 A1 6/2014
DE 102015008577 A1 1/2016
(Continued)

*Primary Examiner* — Khoi H Tran
(74) *Attorney, Agent, or Firm* — Smartpat PLC

(57) ABSTRACT

A method creates gripping-task-specific gripper sequence programs of an item gripper which is controlled by a gripper control module and has a gripper main body and a gripping tool. The item gripper transmits a gripper-main-body-specific identification signal to the gripper control module. The gripper control module assigns a gripper dataset from a database to this identification signal. The dataset has an allowable value range for each settable parameter of the item gripper. A gripping-task-specific configuration dataset for the item gripper is created by a peripheral device. The gripper control module determines gripping-task-specific target values and test criteria. A processing unit of the item gripper establishes the time profile of the actuation of the gripper drive from the target values and determines gripper-specific test values from the test criteria. The present method creates both a sequence program for closing the item gripper and a sequence program for opening the item gripper.

10 Claims, 3 Drawing Sheets

(58) Field of Classification Search
USPC .......................................................... 700/245
See application file for complete search history.

(56) References Cited

U.S. PATENT DOCUMENTS

| | | | |
|---|---|---|---|
| 9,475,198 B2 * | 10/2016 | Mishra | .................. B25J 9/1602 |
| 9,687,982 B1 | 6/2017 | Jules et al. | |
| 10,850,393 B2 | 12/2020 | Oestergaard et al. | |
| 2007/0135933 A1 * | 6/2007 | Panesse | ................. B25J 9/1671 |
| | | | 700/17 |
| 2013/0211593 A1 | 8/2013 | Domae et al. | |
| 2016/0008978 A1 | 1/2016 | Oguri | |
| 2019/0077023 A1 | 3/2019 | Eto et al. | |
| 2020/0311956 A1 | 10/2020 | Choi et al. | |

FOREIGN PATENT DOCUMENTS

| | | | |
|---|---|---|---|
| DE | 102016208362 A1 | 11/2017 | |
| DE | 102016111173 A1 | 12/2017 | |
| DE | 112011103794 B4 | 1/2019 | |
| DE | 102019107967 | 8/2020 | |

* cited by examiner

METHOD FOR CREATING GRIPPING SEQUENCE PROGRAMS

CROSS-REFERENCE TO RELATED APPLICATION

This application is a national stage application, filed under 35 U.S.C. § 371, of International Patent Application PCT/DE2022/000048, filed on May 5, 2022, which claims the benefit of German Patent Application DE 102021002418.4, filed on May 7, 2021.

TECHNICAL FIELD

The disclosure relates to a method for creating gripping-task-specific gripper sequence programs of a driven item gripper which is controlled by means of a gripper control module and has a gripper main body and at least one gripping tool.

BACKGROUND

DE 10 2019 107 967 B3 discloses a method for training a gripper suspended from an industrial robot. Thereby, a required gripping force is ascertained and stored by repeatedly gripping an item.

SUMMARY

The present disclosure creates both a sequence program for closing the item gripper and a sequence program for opening the item gripper.

This is achieved with the features of the main claim. For this purpose, the item gripper transmits a gripper-main-body-specific identification signal to the gripper control module via a signal and data interface. The gripper control module assigns a gripper dataset from a database to this gripper-main-body-specific identification signal, which dataset has an allowable value range for each settable parameter of the item gripper. The database can be stored in the gripper control module or obtained via a data network, for example from the manufacturer of the item gripper. By means of actuating the at least one gripping tool, at least one reference value for the position of the at least one gripping tool relative to the gripper main body is ascertained. When a bidirectional data interface with the gripper control module is active, a gripping-task-specific configuration dataset for the mounted item gripper is created by means of a peripheral device. The gripper control module checks the position of each reference value ascertained and each input value of the configuration dataset entered by means of the peripheral device within the allowable value range of the associated parameter of the gripper dataset. The gripper control module checks the position of a combination of a plurality of values of the configuration dataset within an allowable range of the gripper dataset determined by a plurality of parameters. The gripper control module determines gripping-task-specific target values and test criteria from the values of the configuration dataset and the at least one reference value. A processing unit of the item gripper establishes the time profile of the actuation of the gripper drive from the target values and determines gripper-specific test values from the test criteria.

The data interface between the gripper control module and the peripheral device integrates the peripheral device into a dialog for program creation. A configuration dataset that contains geometric and dynamic information about the gripping task is created. The creation of the configuration dataset can be effected interactively with the operator or by confirming data suggestions from the gripper control module. When creating the sequence programs for opening and closing the gripper, stored gripper-main-body-specific parameters, parameters of the gripper tools and the configuration dataset are processed. The two sequence programs establish the target values for the end positions of all gripping tools and the test criteria for fulfilling the respective gripping task. The acceleration, holding time and deceleration of the drive actuation, among other things, are determined from the target values by means of a processing unit of the item gripper. Such processing unit assigns physical variables to the test criteria, which are recorded in the item gripper by means of sensor systems.

Further details of the invention are given in the subclaims and the following description of schematically illustrated embodiments.

DETAILED DESCRIPTION

Figure 1:
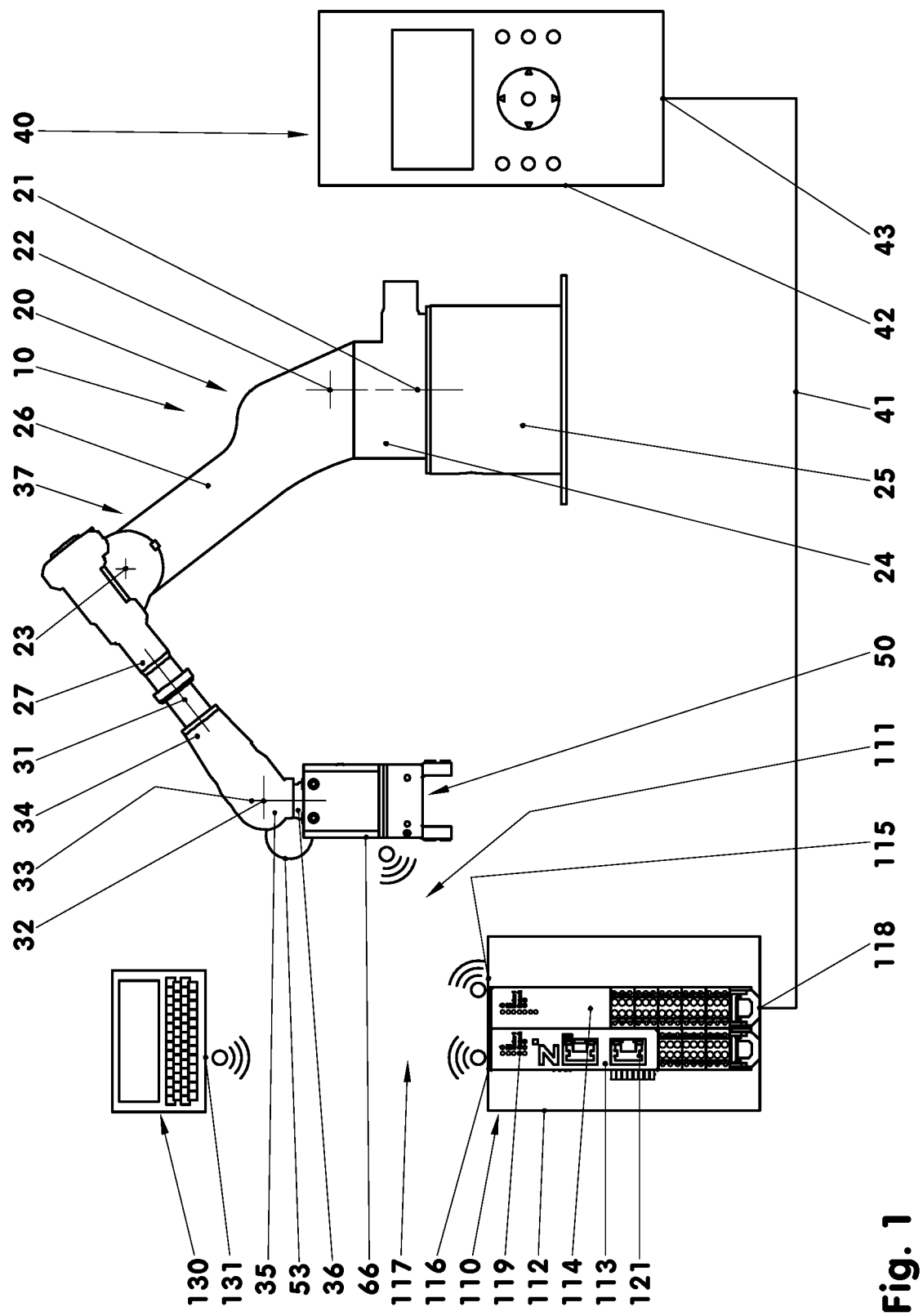
FIG. 1: Diagram of a handling system.

FIG. 1 shows a diagram of a handling system (10) for handling items (1). This handling system (10) comprises an industrial robot (20) that carries an item gripper (50) on its cantilevered arm (37), for example. An industrial robot controller (40) is used to control the industrial robot (20). The item gripper (50) is controlled by means of a gripper control module (110). Thereby, the industrial robot controller (40) communicates with the gripper control module (110) by means of a signal interface (41).

The industrial robot (20) shown is a 6-axis robot in the form of a vertical articulated arm robot. It has a serial kinematic structure in the form of RRR kinematics. This comprises three main rotational axes (21-23). The main axes of such industrial robot (20) are an A-axis (21), a B-axis (22) and a C-axis (23). The A-axis (21) comprises a turntable (24) with a vertical axis of rotation, which is arranged on a base (25). As the first kinematic chain link, the turntable (24) supports a foot lever (26) that can be pivoted about the horizontal B-axis (22), for example by 210 degrees. The C-axis (23), which carries the knee lever (27), is seated at the end of the foot lever (26) as a joint with a horizontal pivot axis. The knee lever (27) can be pivoted relative to the foot lever (26) by, for example, 270 degrees.

In the exemplary embodiment, the three auxiliary axes (31-33) of the industrial robot (20) are also designed as rotary axes. The first auxiliary axis (31), the D-axis (31), comprises a carrier arm (34) rotatable about its longitudinal axis, which is mounted on the free end of the knee lever (27). The second auxiliary axis (32) is the E-axis (32), around which a hand lever (35) is pivotably mounted, for example by 270 degrees. The hand lever (35) carries a turntable (36) that can be pivoted by 360 degrees and is mounted to rotate about the F-axis (33). The item gripper (50) is arranged on the turntable (36). Thereby, the item gripper (50) can be mounted directly or by means of an adapter on the turntable (36). The orientation of the item gripper (50), among other things, is determined by means of the specified auxiliary axes (31-33).

During operation of the industrial robot (20), the item gripper (50) can travel along almost any straight path or curved line in the workspace by a corresponding actuation of the individual axes (21-23, 31-33) of the industrial robot (20). Another structure of the industrial robot (20), for example in the form of a gantry robot, a column robot, a polar robot, a SCARA robot, etc. is also conceivable. Such industrial robots (20) can have translatory axes. For example, they then have TTT, RTT or RRT kinematics. A structure of the industrial robot (20) as a tripod, pentapod or hexapod is also conceivable. These have parallel kinematics, for example.

The industrial robot controller (40) is a programmable logic controller, for example. This has a modular structure, for example, and is arranged in a control housing (42), for example a control cabinet. For example, one or more free slots for further control modules or additional function modules can be provided in the specified control housing (42). The programmable logic controller is an electronic controller with internal wiring that is independent of the control task. The programmable logic controller can be effected as online programming or offline programming. Online programming can be effected using a teaching-in process, for example. Offline programming can, for example, be graphically interactive programming. With such programming, a sequence program for the industrial robot (20) is generated or stored in the programmable logic controller. Such sequence program controls, for example, the movements of the individual joints of the main and auxiliary axes of the industrial robot (20). Thereby, the sequence program of the industrial robot controller (40) is designed, for example, as a path controller.

For example, the industrial robot (20) is hard-wired to the industrial robot controller (40). Such wiring is used, for example, to exchange data and signals between the industrial robot (20) and the industrial robot controller (40) in both directions. In the following, data is understood to mean reinterpretable representations of information in a formalized form, which are suitable for communication and processing in the process. These are, for example, information packages transmitted record by record that describe a program sequence or control a program sequence. In the following, signals are understood to be binary signals. These are digital signals in which each signal element can have one of two discrete values. A signal of this type, for example a command signal or a status signal, consists of a maximum of four bytes in the exemplary embodiment. For example, by means of the data, the power supply to the industrial robot (20) is controlled. Such power supply is, for example, a 24 volt or 48 volt DC power supply. By means of the power supply of the industrial robot (20), for example, all of the drive motors of the industrial robot (20) are supplied. In addition, a power connection for the item gripper (50) is provided on the turntable (36), for example. The DC cable (53), for example, is used for the energy supply of the item gripper (50).

An interface bank (43) is arranged on the industrial robot controller (40). This interface bank (43) is part of the signal interface (41). Binary signals can be transmitted bidirectionally between the industrial robot controller (40) and the gripper control module (110) via such interface bank (43). The two states of a signal element of a binary signal are, for example, "zero" and "one." For example, the exchange of signals is effected at the level of machine language. In the exemplary embodiment, up to 12 different binary signals are exchanged between the industrial robot controller (40) and the gripper control module (110).

Figure 2:
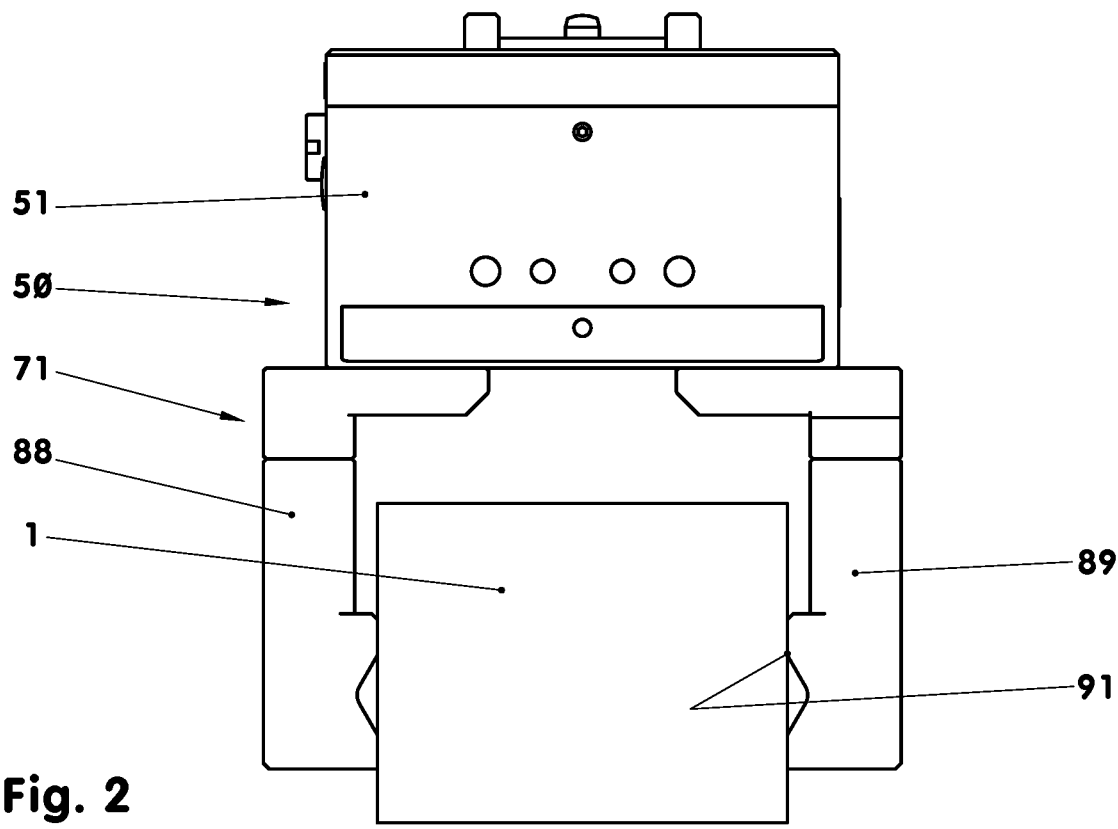
FIG. 2: Item gripper.
Figure 3:
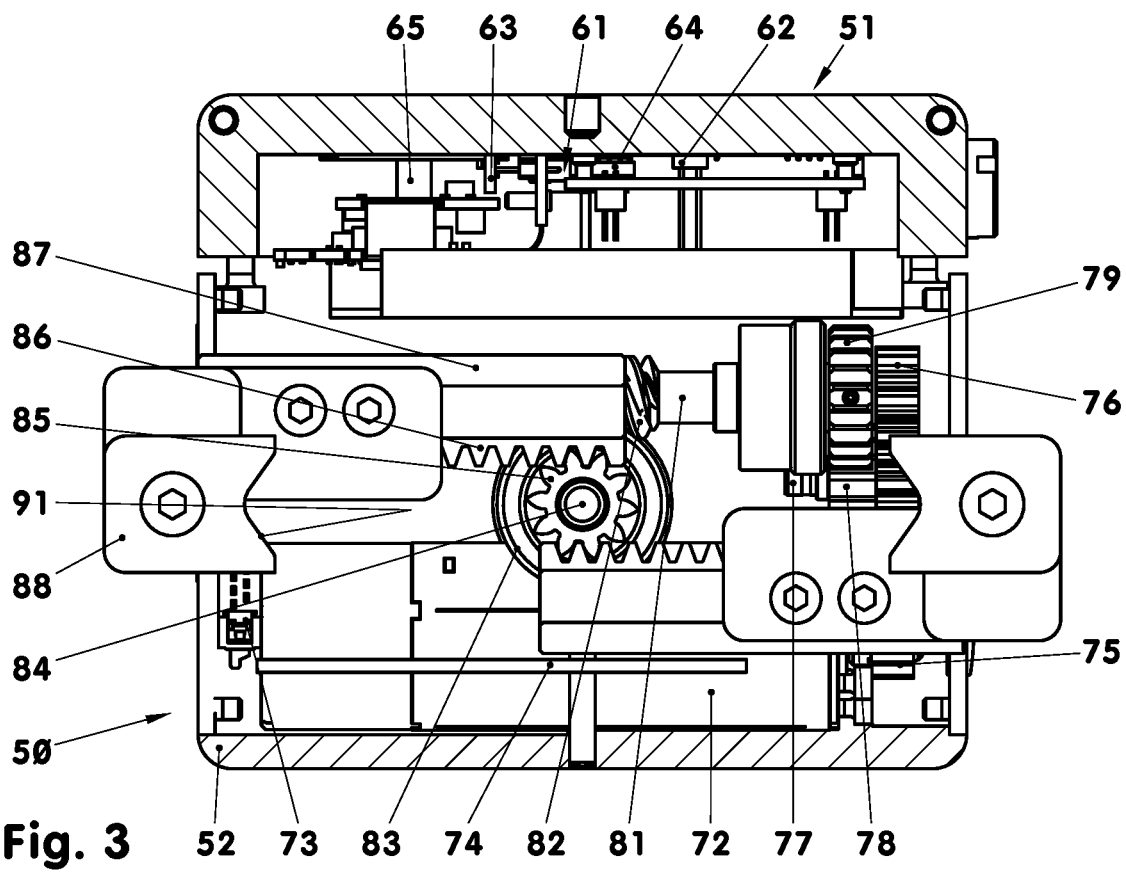
FIG. 3: Item gripper with partially removed housing.

FIGS. 2 and 3 show an item gripper (50) in a view and in a plan view with a partially cut gripper housing (52). The item gripper (50) shown comprises a gripper main body (51) and two gripping tools (71). The gripping tools (71) are mounted and guided in the gripper main body (51), for example. It is also conceivable to use an item gripper (50) with a single gripping tool (71). This can be, for example, a suction gripper, a magnetic gripper, etc. The item gripper (50) can also have more than two gripping tools (71). These can be driven together or individually relative to the gripper main body (51).

In this exemplary embodiment, an electronics module (61) is arranged in the gripper housing (52) of the gripper main body (51). The item gripper (50) can also be designed in such a way that parts of the electronics module (61) are arranged in a separate housing.

In this exemplary embodiment, the electronics module (61) comprises an energy storage unit (62), a processing unit (63), a memory unit (64) and a radio module (65). The energy storage unit (62) is formed, for example, by a capacitor used in a DC circuit. At high accelerations of the gripping tools (71), additional energy can be made available to the drive motor (72) of the gripping tools (71) by means of such energy storage unit (62). This can, for example, reduce feedback effects of consumption peaks on the industrial robot (20).

If necessary, the operating voltage of the electronics module (61) or individual components (62-65) can be lower than the voltage transmitted via the DC cable (53). In this case, the electronics module comprises an additional voltage converter, for example.

The processing unit (63) is connected in a hard-wired manner to the radio module (65) as well as to the electric motor (72) and sensor systems (73, 74) of the item gripper (50) by means of signal-carrying and/or data-carrying lines. By means of the processing unit (63) and the memory unit (64), for example, data recorded by means of the sensor systems (73, 74) of the item gripper (50) can be evaluated and compressed. From the compressed data, for example, information on the wear of the item gripper (50) or its components can result.

In the exemplary embodiment, the radio module (65) has a transmitter and a receiver. Both the transmitter and the receiver are designed for a frequency in the range of 2.4 gigahertz, for example. Another frequency range, for example 5.8 gigahertz, is also conceivable. The respective receive frequencies in this range can adapt to the transmit frequency of the counterpart station. For example, the voltage applied to the radio module (65) amounts to 3.1 to 4.2 volts. The bidirectional interface bank (66) formed by the radio module (65) is designed to be asynchronous serial, for example. A transmission protocol used for UART, Bluetooth, WLAN, IO-Link® wireless, etc. is used as the transmission protocol. The cycle time of the data transmitted to the gripper control module (110) via the signal and data interface (111), which is designed as a point-to-point connection, is less than 5 milliseconds, for example. The error rate here is $10^{-9}$, for example. Thus, the data transmitted via the signal and data interface (111) has a low delay time or latency.

The item gripper (50) has a gripper drive that drives the gripping tools (71) relative to the gripper housing (52). In the exemplary embodiment, the gripper drive is an electric motor (72), for example in the form of a servomotor. The electric motor (72) used in this exemplary embodiment can have an attached rotary encoder in the form of a resolver. The use of an absolute value encoder, for example in multi-turn design, is also conceivable. An absolute value encoder can, for example, be designed as a combined encoder with an asynchronous output interface. By means of a sensor of this type, both the speed of the electric motor (72) and, starting from a reference point, the absolute angular position of the motor shaft can be output. The output signal of such sensor is, for example, an analog signal that lies in the range between 4 milliamps and 20 milliamps.

In the exemplary embodiment, the current transmitted to the electric motor (72) is monitored by means of a gripping-force-dependent sensor system (73). This sensor system (73) is, for example, a current switch (73). If the transmitted current exceeds a preset threshold value, the current supply to the electric motor (72) is limited or switched off. At the same time, such current switch (73) reports this status signal to the processing unit (63).

The electric motor (72) is arranged transversely in the gripper housing (52) in the representation of FIG. 3. It has an output pinion (75) that meshes with an input gear (76) of an intermediate shaft (77). An output gear (78) is also seated on the intermediate shaft (77). Such output gear (78) drives a worm shaft gear (79), which is seated on a worm shaft (81). In this exemplary embodiment, the output pinion (75), the input gear (76), the output gear (78) and the worm shaft gear (79) are spur gears with straight teeth. They translate the rotation of the output pinion (75) into slow speed in several stages.

The worm shaft (81) carries a worm (82), which meshes with a worm gear (83) mounted centrally in the gripper housing (52). The worm gear (83) is seated on a common shaft (84) with a synchronizing gear (85) with straight teeth. Such synchronizing gear (85) meshes with two counter-rotating gear racks (86), each of which is part of a carriage (87). For example, due to the high overall transmission ratio of the gear stages and the gearbox structure, the gearbox of the item gripper (50) is self-locking. The two carriages (87) can be displaced parallel to one another in the gripper housing (52) on plain bearings. A roller bearing of the carriages (87) in the gripper housing (52) is also conceivable. Each of the carriages (87) can also be driven by means of its own electric motor (72). Such electric motors (72) are then controlled, for example, in such a way that their speed and position information is evaluated both individually and collectively. With a floating bearing of this type of the carriages (87), for example, an item (1) lying off-center relative to the item gripper (50) can be gripped without changing the position of the axes (21-23, 31-33) of the industrial robot (20).

A gripper-stroke-dependent sensor system (74) can be arranged on at least one of the carriages (87) and on the gripper housing (52). This is, for example, an absolute displacement measuring system. It comprises, for example, a coded glass scale. The coding can be in the form of a Gray code, for example. The position of the carriage (87) relative to the gripper housing (52) is ascertained by means of a light source illuminating the glass scale and an optical sensor. By means of such absolute displacement measuring system (74), both the end positions of the carriage stroke and each intermediate position can be approached repeatedly in both carriage stroke directions. The absolute displacement measuring system (74) can also be formed, for example, by means of a position sensor in the electric motor (72), an absolute encoder, etc.

A gripping tool (71) is fastened to each of the carriages (87). For example, the gripping tool (71) is screwed to the respective carriage (87). In the exemplary embodiment, the individual gripping tool (71) comprises a gripping element (88) in the form of a gripping jaw (88). An item gripper (50) of this type can have two, three or more than three gripping jaws (88). At least two gripping jaws (88) are designed to be movable relative to one another. Each of the, for example L-shaped, gripping jaws (88) has at least one gripping surface (91) arranged on a gripping arm (89). The two gripping surfaces (91) of the parallel grippers shown point towards the central transverse plane of the item gripper (50). In the exemplary embodiment, each of the gripping surfaces (91) is designed in a U-shape. The individual gripping surface (91) of the outer gripper (140) is aligned in the direction of the respective other gripping surface (91).

A force sensor can be fastened to each of the gripping surfaces (91) or a plurality of force sensors can be arranged on one gripping surface (91). When using a single force sensor, for example, it has a diameter of 11 millimeters and a height of 5 millimeters. Its mass amounts to 10 grams, for example. In the exemplary embodiment, the individual force sensor, designed as a pressure sensor, has a measuring range of 0 Newton to 50 Newton. Its supply voltage amounts to 5 volts, for example. The nominal resistance of the force sensor integrated into a Wheatstone bridge, for example, amounts to 350 ohms. The force sensor can be glued to the respective gripping surface (91), for example. To avoid tilting, the introduction of force can, for example, also be centered. The connection of the force sensor is effected by means of a four-core cable, for example. Such cable connects the individual force sensor to the electronics module (61) after the mounting of the respective gripping tool (71).

With an arrangement of a plurality of force sensors on a gripping surface (91), they can be arranged as a group in a matrix-like array. Such force sensor group, for example, has a force application area of 17 millimeters by 17 millimeters and a height of 5 millimeters. In the example, its mass amounts to 5 grams. A force sensor group of this type has 36 individual sensors, for example. The force measuring range, the power supply and the connection cable of such group correspond, for example, to the corresponding values of the individual force sensor described above. The maximum allowable pressure force on the force sensor group and on the force sensor amounts to, for example, 1.5 times the maximum nominal force.

The two gripping arms (89) of the parallel gripper shown are aligned parallel to one another. However, the item gripper (50) can also be designed as an angular gripper, a needle gripper, a parallelogram gripper, etc. It can also be designed as an inner gripper. The gripping tools (71) can be designed for the force-fit and/or form-fit picking up of items (1). The individual item (1) is, for example, a workpiece. This is conveyed from a magazine to a processing machine or in the reverse direction, for example, by means of the handling system (10). The item (1) can, for example, also be a cutting tool, for example a milling tool, drilling tool, sawing tool, etc., which is transported between a tool holder on the machine side and a tool magazine. It is also possible to pick up other types of items (1).

In the representation in FIG. 1, the gripper control module (110) is arranged next to the industrial robot (20). The gripper control module (110) comprises, for example, a control cabinet (112) with control cards (113, 114) arranged therein. The control cards (113, 114) can also be accommodated in the control housing (42) of the industrial robot controller (40). The control cards (113, 114) are connected to the industrial robot controller (40) by means of the signal interface (41). If necessary, such binary signal interface (41) can also be designed to be wireless. For example, the energy supply of the gripper control module (110) is effected by the industrial robot controller (40). However, the energy supply of the gripper control module (110) can also be galvanically isolated from the energy supply of the industrial robot controller (40). The energy supply of the gripper control module (110) can be buffered by means of an energy storage unit, for example by means of a battery.

FIG. 1 shows the diagram of the handling system (10) with the interfaces (41, 111, 117) and with a peripheral device (130). The gripper control module (110) has at least one serial interface bank (115). Data and signals can be exchanged wirelessly with the item gripper (50) via such interface bank (115). Such exchange is effected via the signal and data interface (111). The gripper control module (110) has a radio module for this purpose. Such radio module is constructed, for example, in the same way as the radio module (65) described in connection with the item gripper (50). The gripper control module (110) can have further radio modules of this type for bidirectional communication with further item grippers (50). With such radio modules, for example, the respective antenna can be tracked in the direction of the assigned item gripper (50). The respective polarization plane coincides, for example, with the polarization plane of the item gripper (50).

In the exemplary embodiment, the gripper control module (110) has a further interface bank (116) of a wireless data interface (117), for example. Such data interface (117) differs from the wireless signal and data interfaces (111) between the gripper control module (110) and the item grippers (50), for example in the frequency range and/or the transmission protocol used. The control-side interface bank (116) of the data interface (117) is referred to below as the control-side operator-oriented interface bank (116). The data interface (117) is a temporary operator-side interface (117). It only exists after a data connection has been established between an operator-side peripheral device (130) and the gripper control module (110). When the peripheral device (130) is disconnected from the data interface (117), such temporary data interface (117) is switched off. The data interface (117) can also be designed to be wired.

The gripper control module (110) comprises an application computer and a data storage unit. For example, the application computer has three processors. In the exemplary embodiment, a first processor has a clock frequency of 264 megahertz, a further processor has a clock frequency of 1.2 gigahertz and the third processor has a clock frequency of 1.6 gigahertz. Thereby, the processor first specified can be used for external direct control, for example. The circuit board of the application computer has dimensions of 30 millimeters by 30 millimeters, for example. For example, its height including the mounting amounts to one millimeter. The application computer is connected by cable both to the binary interface bank (118) of the signal interface (41) and to the wireless interface banks (115, 116) of the signal and data interface (111) and the data interface (117). Process data, event data and maintenance data, for example, are processed and collected in the application computer and/or in the data storage unit. Light-emitting diodes (119) are arranged on the gripper control module (110) to indicate the operating status of the application computer. In addition, additional connections (121) for wired data and/or signal transmissions are provided on the gripper control module (110).

The non-volatile data storage unit connected to the application computer is electrically buffered and has a storage capacity of, for example, two times 16 megabytes. In the exemplary embodiment, it has eight pins. Their dimensions amount to, for example, 8 millimeters by 5.3 millimeters by 2 millimeters.

In this exemplary embodiment, a higher capacity application computer and data storage unit can also be used. This means, for example, that an operating system and/or a programmable logic controller for the item gripper (50) can be installed in the application computer. For example, the operating system is a real-time operating system.

A setup program for creating gripper sequence programs is installed in the gripper control module (110). The setup program is, for example, a text-based program that communicates with the peripheral device (130) incrementally and/or step by step via the data interface (117). For example, the text of the setup program is created in a hypertext markup language, for example HTML. This setup program can be combined, for example, with various operating systems of gripper control modules (110), industrial robot controllers (40) and peripheral devices (130).

The peripheral device (130) has a user program for text-based information display. After establishing a data connection to the setup program via the data interface (117), the setup program controls the display of the user interface for the user. The user program of the peripheral device (130), for example a commercially available browser, can be designed to be neutral with respect to the operating system.

To enter parameters for the gripper control module (110), a commercially available portable computer (130) is used as a peripheral device (130), for example. Such computer (130) has an interface bank (131) of the, for example wireless, data interface (117). The data interface (117) described here between the gripper control module (110) and the peripheral device (130) can, for example, alternatively be set up between the peripheral device (130) and the item gripper (50). In the latter case, the computer (130) then communicates with the item gripper (50) via the handling-side operator-oriented interface bank specified above.

After setting up the wireless data interface (117), the operator calls up a configuration program of the setup program by means of the computer (130). This is effected, for example, when the handling system (10) is at a standstill. The power supply to the gripper control module (110) and the item gripper (50) is switched on. The signal and data interface (111) between the gripper control module (110) and the item gripper (50) is active. The item gripper (50) transmits a gripper-housing-specific identification signal to the gripper control module (110). The gripper control module (110) recognizes from this identification signal, for example, the gripper type, the maximum stroke, the measuring ranges of the sensor systems, the maximum allowable forces and accelerations, etc. The gripper control module (110) assigns a gripper-specific gripper dataset to such identification signal from a database. Such gripper dataset contains, for example, the technical data and the technically allowable limits when using the item gripper. A value range is stored in the gripper dataset for each settable parameter of the item gripper (50). The allowable ranges for the interaction of a plurality of parameters, for example force and displacement, are also stored. From such identification signal, the gripper control module (110) transmits information to the peripheral device (130), for example, that the item gripper (50) connected to the industrial robot (20) is a parallel gripper. This can be driven electrically, pneumatically or hydraulically, for example. The gripper-side identification signal can also contain information for identifying the gripping tools (71).

Figure 4:
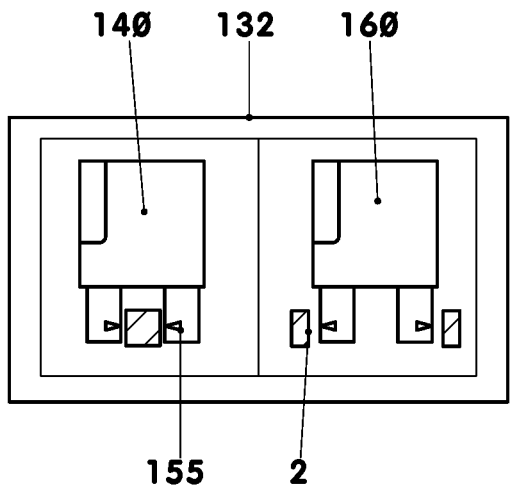
FIG. 4: Query of the gripping direction.

Based on such information, the screen (132) shown in FIG. 4, for example, is displayed to the operator. Two gripper systems (140, 160) are displayed on the screen (132) for selection. The first gripper system (140) shown on the left is an outer gripper (140). When gripping an item (1), the two gripping tools (71) contact the item (1) from the outside. The gripping directions (155) point towards one another. The respective gripping direction (155) is the direction in which the respective gripping tool (71) moves to pick up the item (1). The gripper system (160) shown on the right is an inner gripper (160). When picking up the item (1), the gripping tools (71) rest against the inner walls (2) of the item (1). The gripping directions (155) of the inner gripper (160) point in opposite directions. For example, after selection of the outer gripper (140) by the operator, such first datum is stored in the configuration dataset.

Figure 5:
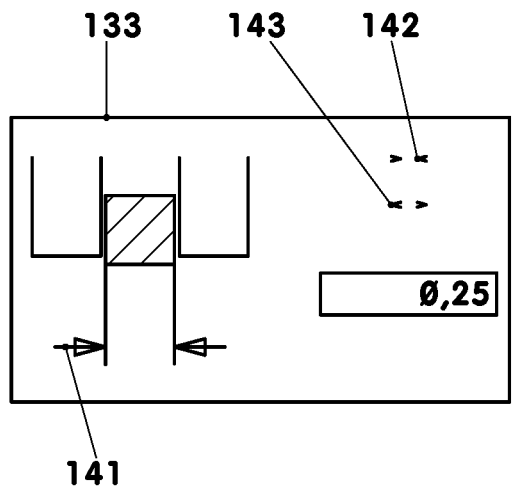
FIG. 5: Ascertainment of the gripping length.

The screen (133) shown in FIG. 5 is used to ascertain the gripping length (141) for the intended gripping task. The gripping length (141) is the nominal distance between the gripping tools (71) when picking up the item (1). For example, such gripping length (141) corresponds to the length or width of the item (1). In the exemplary embodiment, the gripping length (141) is ascertained by touching both gripping tools (71) to the item (1). Thereby, for example, the buttons (142) are used for closing the item gripper (50) step by step. By means of the buttons (143), the gripping tools (71) can be moved apart. A single switching step of the step by step adjustment amounts to 0.01 millimeters, for example. As soon as all gripping tools (71) contact the item (1), the corresponding value of the gripper-stroke-dependent sensor system (74) is registered and stored. Such value is a reference value for the position of the gripper tools (71) relative to the gripper main body (51) in the gripper stroke direction. For example, the following steps are carried out relative to such adjustment. In this exemplary embodiment, the reference value corresponds to the gripping length (141).

It is also conceivable to use a standard body of defined length to ascertain the reference value, which is arranged between the gripping tools (71). The gripping length (141) can then be set based on such reference value, for example by means of direct numerical input or by means of the buttons (142, 143). The gripping-tool-specific reference values can also be taken from a gripping tool database or entered directly. In the case of an item gripper (50) with individually driven gripping tools (71), a separate reference value can be ascertained for each gripping tool (71). Thus, picking up an off-center item (1), for example, is conceivable.

After ascertaining the gripper length (141) or entering the value of the gripper length (141), by means of the gripper control module (110), there is a check of whether the gripper stroke is designed for the specified dimension. If, for example, the target gripping length is outside the range that can be reached by means of the gripper stroke, an error message is output. The operator can, for example, use other gripping tools (71) and/or a different item gripper (50) for the gripping task.

If an inner gripper (160) is selected in the screen shown in FIG. 4, a corresponding symbolic image of an inner gripper (160), instead of the screen shown in FIG. 5, is displayed to the operator. In this case, the gripping length (141) is the distance between the outer gripping surfaces (91) when picking up the item (1).

Figure 6:
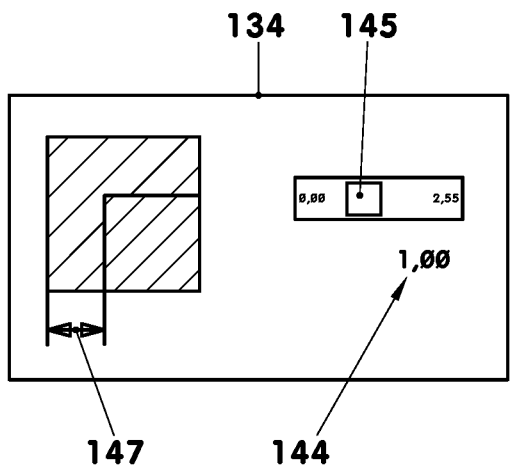
FIG. 6: Query of the tolerance of the gripping length.

After entering and, for example, confirming the entry on the screen (133) shown in FIG. 5, the screen (134) shown in FIG. 6 is displayed to the operator. The screen display in FIG. 6 can be used identically for an inner gripper (160) and for an outer gripper (140). By means of such screen display, the tolerance (144) of the item (1) for the dimension of the gripping length (141) is queried. Such value can either be entered numerically or adjusted continuously by means of a slider (145). The tolerance zone (147) is related to the nominal gripping length (141). The tolerance zone (147) can extend from here in the gripping direction (155) and in the direction opposite to this. The corresponding position of the tolerance zone can be displayed numerically and/or visually. If the gripping length (141) of the item (1) is within the tolerance zone (147), the corresponding adapted gripper stroke can be divided between both gripping tools (71), for example. When the tolerance value (144) is confirmed, such value is stored in the gripper control module (110).

Figure 7:
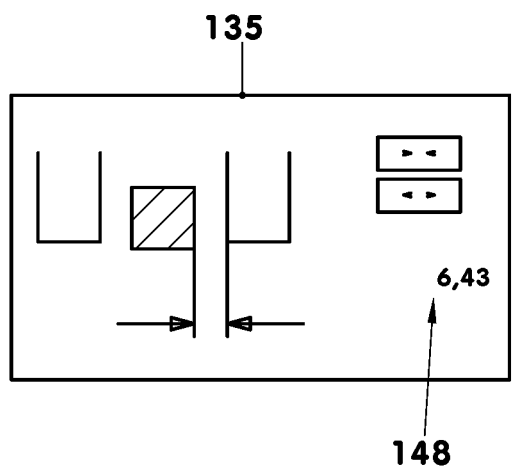
FIG. 7: Query of the open position.

The operator is now shown the screen (135) with a screen display as shown in FIG. 7. FIG. 7 shows the screen display for an outer gripper (140). When using an inner gripper (160), the display is adapted accordingly. With this query shown in FIG. 7, the minimum distance of the individual gripping tool (71) from the item (1) is ascertained after the item (1) has been deposited in order to enable the subsequent functions. When checking the input value, the system checks, among other things, whether the sum of twice the entered distance value (148) and the gripping length (141) is less than or equal to the maximum distance between the gripping tools (71) in the open position of the item gripper (50). If, for example, a distance value (148) that does not meet this requirement is inadvertently entered, an error message is displayed to the operator. Instead of the specified distance value (148), the query for the open position can also ascertain the distance between the gripping tools (71). The stroke of the gripping tools (71) when opening the item gripper (50) is calculated taking into account the reference value specified above. When the distance value (148) is confirmed on the operator side, such value is stored in the gripper control module (110) as a further value in the configuration dataset.

When using an inner gripper (160), the plausibility check ascertains whether the gripping length (141) is greater than twice the distance value (148). If this condition is not met, an error message is output.

Figure 8:
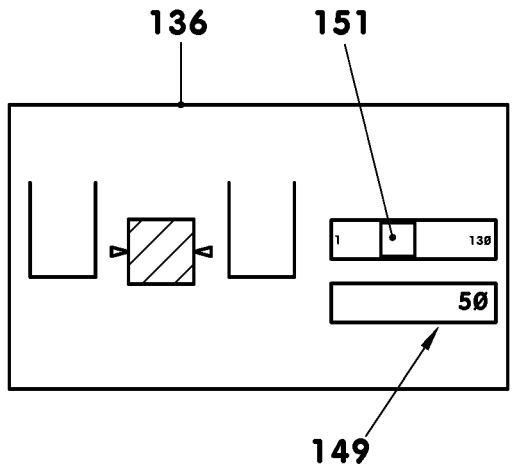
FIG. 8: Query of the gripping force.

The screen (136) shown in FIG. 8 is used to query a value for the contact force (149) of the gripping tools (71) on the item (1). In the exemplary embodiment, a force-specific value is entered as a percentage of a nominal value. Thereby, the entry can be effected numerically or via a slider (151). The nominal value, for example, designates a maximum allowable contact force. For example, the force in Newton, the mass of the item (1) in kilograms or the current of the electric motor (72) in amperes can be entered for the contact-force-specific datum. For example, the mass of the item (1) and the acceleration due to gravity together with the coefficient of friction between the gripping tools (71) and the item (1) determine the minimum contact force (149) when picking up the item (1). In the exemplary embodiment, such contact force (149) is generated by the electric motor (72), the torque of which increases with increasing actuation current. Such torque determines the feed force of the gripping tools (71) and thus the contact force (149) of the gripping tools (71) on the item (1).

If, for example, a maximum actuation current of the electric motor (72) is used as a contact-force-specific value, this can also determine the actuation voltage during the movement of the gripping tools (71). For example, with constant motor power, the actuation current when closing the outer gripper (140) amounts to 70% of the maximum actuation current. This results—without additional control of the magnetic field—in a rotor voltage, for example, and thus a motor speed. Thus, by means of specifying a value for the contact force (149), the closing speed of the item gripper (50) can also be determined.

When specifying the contact force, the gripping force ascertained by means of the force sensors arranged on the gripping surfaces (91) at which the item (1) can be securely picked up can be specified, for example. For example, the values of the gripping forces ascertained by means of the gripping-force-dependent sensor systems (73) of both gripping surfaces (91) are added together. Thereby, the respective amount of force is the value that is ascertained, for example, 20-30 milliseconds after the gripping elements (88) hit the item (1). Such contact-force-specific value is then used to design the actuation of the gripping tools (71), as described above.

With a suction gripper, for example, the actual negative pressure at which the item (1) is held securely is ascertained. By means of such value, the actuation of the suction pump in the sequence program is determined. For example, the actual negative pressure ascertained above is established as the gripping-task-specific limit value of the gripping-force-dependent sensor system (73).

When using an inner gripper (160), a value for the contact force (149) is also queried. In this case as well, the contact force (149) is the sum of all the forces with which all the individual gripping tools (71) press on the item (1).

Figure 9:
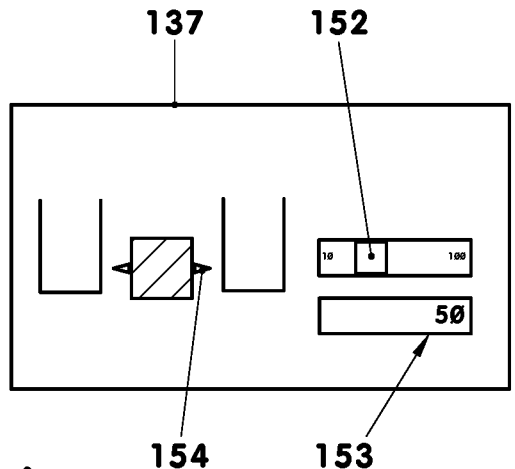
FIG. 9: Query of the opening speed.

After depositing the value for the contact force (149) in the configuration dataset, the screen (137) shown in FIG. 9 is displayed to the operator. Such query is used to ascertain the opening speed (153). Thereby, the input value can be entered by means of a slider (152) or numerically, for example. The physical variable controlled by this can be a actuation voltage in volts, a motor torque in Newton meters, a speed in meters per second, a magnetic field strength, etc. In the exemplary embodiment, a value is queried as a percentage of a maximum value. For example, when using a DC motor, the motor torque and the motor speed depend on the motor voltage. Thus, the travel speed of the gripping tools (71) during opening depends on the said variables.

When using an inner gripper (160), the gripping tools (71) are moved in mutually facing directions when opening. In this case, the opening direction (154) of the gripping tools (71) shown symbolically on the screen (137) is oriented inwards.

For example, after determining a value for the opening speed (153) and storing it in the configuration dataset, the creation of the configuration dataset is complete. The gripper control module (110) checks the plausibility of the values of the configuration dataset that influence one another and/or influence a common physical variable. The gripper-specific and item-specific configuration dataset is stored in the gripper control module (110). For example, at the end the operator can confirm the data entered in the configuration dataset. This can be effected on the peripheral device (130) or on the gripper control module (110). Subsequently, the gripper control module (110) creates both target values and test criteria for a sequence program for closing the item gripper (50) and target values and test criteria for a sequence program for opening the item gripper (50), taking into account the configuration dataset, the reference value ascertained and the data of the item gripper (50) stored in the data memory. Thus, such sequence programs are specific to each gripping task. The peripheral device (130) can be separated from the gripper control module (110), for example.

For the creation of the sequence programs, the direction of rotation of the electric motor (72) when opening the item gripper (50) and when closing the item gripper (50) is established from the datum first specified of the configuration dataset. Such direction of rotation is established in such a way that when an outer gripper (140) is used, the gripping tools (71) move towards one another when closing. For opening the item gripper (50), the direction of rotation of the electric motor (72) is oriented in the opposite direction. If an inner gripper (160) was specified in the first query, the directions of rotation of the electric motor (72) are oriented in the opposite direction in each case.

From the data entered for the gripping length (141) and for the associated tolerance zone (147), a test range for the absolute displacement measuring system (74) of the item gripper (50) is established. This is a limit value range for the gripper-stroke-dependent sensor system (74). Thereby, the acceptance range is defined as a range within the tolerance zone (147). If, for example, a value outside the gripping length (141) and its tolerance zone (147) is detected for an outer gripper (140) when the absolute displacement measuring system (74) is queried, an error signal from the item gripper (50) to the gripper control module (110) is established. This can indicate an item (1) of the wrong length, wear, etc. If a query of the absolute displacement measuring system (74) results in a value for an outer gripper (140) that is smaller than the value permitted by the tolerance zone (147), a corresponding dataset that is to be transmitted from the item gripper (50) to the gripper control module (110) is created. A dataset of this type can, for example, indicate that an item (1) is too short (141) or that an item (1) is missing.

From the gripping-force-dependent value contained in the configuration dataset, for example the contact force (149), the gripper control module (110) determines a limit value for the gripping-force-dependent sensor system (73) of the item gripper (50) For example, the switching value of the gripping-force-dependent sensor system (73) is established, upon the exceeding of which, for example, the current of the electric motor (72) is limited or switched off. In the algorithm created by the gripper control module (110) for closing, for example, it is established that the gripping-force-dependent sensor system (74) is queried when the gripping-force-dependent sensor system (73) is switched. The speed gradient can also be queried, for example. If the gripper's own processing unit (63) ascertains a position of the absolute displacement measuring system within the tolerance zone (147) of the gripping length (141) at such point in time, the item gripper (50) transmits a confirmation signal to the gripper control module (110). The sequence program for closing also establishes that the gripper control module (110) transmits such confirmation signal to the industrial robot controller (40) as a signal, processed if necessary.

The gripper control module (110) also determines the travel speed of the gripper tools (71) and their acceleration and deceleration phases from the specified data in the configuration dataset. The amount of deceleration can be less than the amount of the specified acceleration.

The target values and test criteria determined in this way are transmitted to the processing unit (63) of the item gripper (50). The applied motor voltage of the electric motor (72) is determined over time from the target values, for example. This remains below the allowable value of the motor voltage. The motor current during movement is lower than the threshold value established above for the gripping-force-dependent sensor system (73), for example.

For example, when using a pneumatic or hydraulic item gripper (50), the gripper is driven by means of a pneumatic or electric valve. From the target data transmitted by the gripper control module (110), the gripper's own processing unit determines, for example, the electrical voltage for actuating the valve for controlling the pneumatic or hydraulic volume flow for adjusting the gripping tools (71).

From the test criteria for fulfilling the gripping task, the processing unit (63) determines, for example, the amount of the signal current of the analog measuring system. This is used to establish a physical test value for each sensor system (73, 74) based on the test criteria. The cumulative query of both sensor systems (73, 74) specified in the processing unit (63) when closing the gripper (50) can also check the reduction of the closing speed.

To start the sequence program for closing, the gripper control module (110) determines a binary command signal from the industrial robot controller (40). The closing program is started when such signal is received. If necessary, the closing program can also be started optionally, for example by pressing a button on the control cabinet (112) of the gripper control module (110) or on the peripheral device (130). By means of the latter two options, a trial operation can be carried out, for example.

The command input of a start signal in the form of a binary signal from the industrial robot controller (40) is established as the start signal for the sequence program for opening the item gripper (50). The buttons specified above for closing (142) can also be used as options, for example for testing the sequence program. When the gripping-task-specific switching value of the gripper-stroke-dependent sensor system (74) is reached, the electric motor (72) of the item gripper (50) is switched off and the item gripper (50) transmits a confirmation signal to the gripper control module (110). In the gripper control module (110), receipt of such signal signifies the end of the sequence program for opening the gripper (50). This signal, converted if necessary, is forwarded to the industrial robot controller (40) as a binary enable signal for the subsequent processes. The industrial robot controller (40) can now move the axes of the industrial robot (20) further.

The datum of the opening speed from the configuration dataset determines, for example, the maximum actuation voltage of the electric motor (72) during opening. The acceleration and deceleration at the ends of the travel stroke can, for example, be symmetrical to one another. When the item gripper (50) is opened, the maximum acceleration is also determined, for example, by the allowable mass moment of inertia of the moving parts of the item gripper (50), which is reduced to the motor shaft of the electric motor (72). The programs created in this way for closing and opening the gripper (50) are stored in the gripper control module (110).

To pick up an item (1), the axes (21-23; 31-33) of the industrial robot (20) are moved in such a way that the gripper (50) is in a gripping position above the item (1). In this position of the industrial robot (20), the industrial robot controller (40) transmits a command to the gripper control module (110) for closing the item gripper (50). The gripper control module (110) starts the sequence program for closing the item gripper (50). As soon as the item (1) has been successfully picked up, the sequence program for closing the item gripper (50) is ended. As soon as the industrial robot controller (40) receives the confirmation signal of successful gripping, it takes over control of the industrial robot (20) again. The industrial robot (20) now moves the item gripper (50) with the item (1) held on it to an unloading position. Here, the industrial robot controller (40) transmits a command to the gripper control module (110) to open the item gripper (50) when the robot axes (21-23; 31-33) are stationary. The sequence program of the opening runs as described above. After the end of the program and receipt of the release signal, the industrial robot controller (40) takes over the further movement of the industrial robot (20).

The operating data and error messages of the item gripper (50) are collected and compressed in the gripper control module (110). For example, such operating data and error messages are stored in text form. When the peripheral device (130) is connected to the gripper control module (110), such operating data and error messages can be read out by means of the peripheral device (130). Thereby, the user program specified above can be used on the side of the peripheral device (130).

The gripper control module (110) can optimize the created sequence programs. For example, the tolerance zone (147) of the item (1) can be established more precisely during repeated gripping. This means, for example, that the starting point of the deceleration ramp can be moved in order to speed up the time interval for picking up the item (1).

The sequence program can also be designed in such a way that the applied contact force is optimized on a self-learning basis. For example, the contact force of the gripping tools (71) on the item (1) can be increased if a transverse force component on the force sensors of the gripping surfaces (91) exceeds a predefined limit value. The force sensors are designed as 2D or 3D force sensors, for example. This prevents the item (1) from slipping, for example, even if the ambient conditions change, for example the humidity or the temperature-dependent material strength.

Combinations of the individual exemplary embodiments are also conceivable.

LIST OF REFERENCE SIGNS

1 Item
2 Inner walls
10 Handling system
20 Industrial robot
21 A-axis
22 B-axis
23 C-axis
24 Turntable
25 Base
26 Foot lever
27 Knee lever
31 Auxiliary axis, D-axis
32 Auxiliary axis, E-axis
33 Auxiliary axis, F-axis
34 Carrier arm
35 Hand lever
36 Turntable
37 Arm of (20)
40 Industrial robot controller
41 Signal interface
42 Control housing
43 Interface bank
50 Item gripper, gripper
51 Gripper main body
52 Gripper housing
53 DC cable
61 Electronics module
62 Energy storage unit 63 Processing unit
64 Memory unit
65 Radio module
66 Interface bank, handling side control-side interface bank
71 Gripping tool
72 Drive motor, electric motor
73 Gripping-force-dependent sensor system, current sensor, current switch
74 Gripper-stroke-dependent sensor system, absolute displacement measuring system
75 Output pinion
76 Input gear
77 Intermediate shaft
78 Output gear
79 Worm shaft gear
81 Worm shaft
82 Worm
83 Worm gear
84 Shaft
85 Synchronizing gear
86 Gear racks
87 Carriage
88 Gripping element, gripping jaw
89 Gripping arm
91 Gripping surface
110 Gripper control module
111 Signal and data interface
112 Control cabinet
113 Control card
114 Control card
115 Serial interface bank for (111)
116 Interface bank, control-side operator-oriented interface bank
117 Data interface, operator interface
118 Binary interface bank
119 Light-emitting diodes
121 Connections
130 Peripheral device, computer
131 Interface bank
132 Screen for determining the travel directions
133 Screen for ascertaining the gripping length
134 Screen for selecting a tolerance zone for the gripping length
135 Screen for selecting the distance between the gripping elements when depositing the item
136 Screen for querying the contact force
137 Screen for querying the opening speed
140 Gripper system, outer gripper
141 Gripping length
142 Button
143 Button
144 Tolerance, tolerance value
145 Slider
147 Tolerance zone
148 Distance value
149 Contact force
151 Slider
152 Switch buttons
153 Opening speed
154 Opening direction
155 Gripping direction
160 Gripper system, inner gripper

The invention claimed is:

1. A method for creating gripping-task-specific gripper sequence programs of an item gripper (50), the item gripper (50) having a gripper main body (51) and at least one gripping tool (71), and
the item gripper (50) being controlled by a gripper control module (110),
the method comprising:
transmitting a gripper-main-body-specific identification signal from the item gripper (50) to the gripper control module (110) via a signal and data interface (111);
assigning, by the gripper control module (110), a gripper dataset from a database to the gripper-main-body-specific identification signal, the gripper dataset having an allowable value range for each settable parameter of the item gripper (50);
ascertaining, by actuating the at least one gripping tool (1), at least one reference value for a position of the at least one gripping tool (71) relative to the gripper main body (51);
creating, by a peripheral device (130) while a bidirectional data interface (117) with the gripper control module (110) is active, a gripping-task-specific configuration dataset for the item gripper (50);
checking, by the gripper control module (110), whether each reference value ascertained and each input value of the gripping-task-specific configuration dataset entered by the peripheral device (130) is within the allowable value range of an associated settable parameter of the gripper dataset;
checking, by the gripper control module (110), whether a combination of a plurality of values of the gripping-task-specific configuration dataset is within an allowable range of the gripper dataset determined by a plurality of parameters;
determining, by the gripper control module (110), gripping-task-specific target values and test criteria from the values of the gripping-task-specific configuration dataset and the at least one reference value; and
establishing, by a processing unit (63) of the item gripper (50), a time profile of an actuation of a gripper drive from the gripping-task-specific target values and determining gripper-specific test values from the test criteria.

2. The method according to claim 1,
wherein the gripper control module (110) has a text-based input program for creating the gripping-task-specific configuration dataset, and
wherein the text-based input program communicates with a user program of the peripheral device (130) when the bidirectional data interface (117) is activated.

3. The method according to claim 1,
wherein individual data of the gripping-task-specific configuration dataset are transmitted wirelessly step by step from the peripheral device (130) to the gripper control module (110).

4. The method according to claim 1,
wherein the at least one gripping tool (71) comprises two gripping tools (71); and
wherein the gripping-task-specific configuration dataset comprises
a selection of a gripping direction (155) of the two gripping tools (71),
a tolerance value (144) of an item (1) to be gripped,
a numerical distance value (148) for the two gripping tools (71) relative to one another,
a relative value for a contact force (149) in a gripping position, and
a relative value for an opening speed (153) of the two gripping tools (71).

5. The method according to claim 4,
wherein the gripper control module (110) establishes a direction of rotation of a drive motor (72) of the item gripper (50) when the item gripper (50) is closed and a direction of rotation when the item gripper (50) is opened from an indication of the gripping direction (155) for the gripper drive.

6. The method according to claim 1,
wherein the gripper control module (110) ascertains a limit value for a gripper-stroke-dependent sensor system (74) and a limit value for a gripping-force-dependent sensor system (73) of the item gripper (50) from the gripping-task-specific configuration dataset for the sequence program during closing.

7. The method according to claim 6,
wherein the limit value of the gripping-force-dependent sensor system (73) limits a motor current of a drive motor (72) of the item gripper (50).

8. The method according to claim 1,
wherein the gripper control module (110) uses the gripping-task-specific configuration dataset to ascertain a limit value for a gripper-stroke-dependent sensor system (74) for the sequence program when the item gripper (50) is opened.

9. The method according to claim 1, further comprising:
arranging the item gripper (50) on an industrial robot (20) controlled by means of an industrial robot controller (40),
wherein the industrial robot controller (40) and the gripper control module (110) have a signal interface (41),
wherein, after transmission of a command from the industrial robot controller (40) via the signal interface (41) to the gripper control module (110), either a sequence program for closing the item gripper (50) or a sequence program for opening the item gripper (50) is started.

10. The method according to claim 1, wherein the at least one reference value is ascertained by a gripper-stroke-dependent sensor system (74) of the item gripper (50) when the at least one gripping tool (71) comes into contact with an item (1) to be picked up.

* * * * *